United States Patent
Roth et al.

(10) Patent No.: US 9,973,488 B1
(45) Date of Patent: May 15, 2018

(54) AUTHENTICATION IN A MULTI-TENANT ENVIRONMENT

(71) Applicant: Amazon Technologies, Inc., Reno, NV (US)

(72) Inventors: Gregory Branchek Roth, Seattle, WA (US); Eric Jason Brandwine, Haymarket, VA (US); Bradley Jeffrey Behm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/097,130

(22) Filed: Dec. 4, 2013

(51) Int. Cl.
    *H04L 29/06* (2006.01)

(52) U.S. Cl.
    CPC ................. *H04L 63/0807* (2013.01)

(58) Field of Classification Search
    CPC ....... G06F 21/335; G06F 21/41; H04L 9/083; H04L 9/3213; H04L 63/0807; H04L 63/0815; H04L 63/0838; H04L 9/3228; H04L 2209/76
    See application file for complete search history.

(56) References Cited

U.S. PATENT DOCUMENTS

| | | | | |
|---|---|---|---|---|
| 7,421,576 B1* | 9/2008 | Kent | ................... | H04L 63/0838 380/277 |
| 2006/0288230 A1* | 12/2006 | Crall | ....................... | H04L 9/083 713/183 |
| 2007/0006291 A1* | 1/2007 | Barari | .................... | G06F 21/335 726/10 |
| 2008/0072303 A1* | 3/2008 | Syed | ................... | H04L 63/0838 726/10 |
| 2011/0213966 A1* | 9/2011 | Fu | ....................... | H04L 63/0807 713/158 |

* cited by examiner

*Primary Examiner* — Amir Mehrmanesh
(74) *Attorney, Agent, or Firm* — Hogan Lovells US LLP

(57) ABSTRACT

Techniques are described for enabling a Kerberos-based authentication system to provide a client with access to a plurality of unmodifiable components that require plain text passwords. Such an approach enables a user to sign into a distributed computer system using a single password, and access multiple components that require different passwords without the need to enter a second password. By using Kerberos based authentication, passwords are not unnecessarily sent throughout distributed computing system where they may be vulnerable. A proxy key distribution center can be used to manage passwords or other credentials on behalf of various clients, which can be used with various processes discussed herein.

26 Claims, 7 Drawing Sheets

AUTHENTICATION IN A MULTI-TENANT ENVIRONMENT

BACKGROUND

Users increasingly store sensitive data electronically, utilizing various network security protocols, such as the Kerberos authentication protocol. Such protocols can supply network authentication using "tickets" that allow nodes to communicate over a non-secure network to authenticate themselves in a secure manner. Some protocols are aimed primarily at a client-server model, and provide for mutual authentication. Thus, the identities of both the user and the server are verified using such protocols. Various protocols may require a trusted third party, such as a Key Distribution Center (KDC). A KDC typically comprises two logically separate parts: an Authentication Server (AS) and a Ticket Granting Server (TGS). The KDC maintains a database of secret keys. Each entity on the network (e.g., clients, servers, etc.) has a secret key that is known only to itself and the KDC. When two entities on a network communicate, the KDC generates a session key that can be used to secure interactions between the entities.

Challenges may arise when using a web login page to front a Kerberos integrated component where the source code cannot be modified, such as for a virtualized desktop service or an instance accepting only credential based login. Typically, an unmodified component expects a credential (e.g., a password) to be entered rather than a Kerberos ticket to be presented. Exposing a user password to multiple components of a distributed system presents many security problems, such as the misrouting of data comprising a password.

BRIEF DESCRIPTION OF THE DRAWINGS

Various embodiments in accordance with the present disclosure will be described with reference to the drawings, in which.

DETAILED DESCRIPTION

Figure 1:
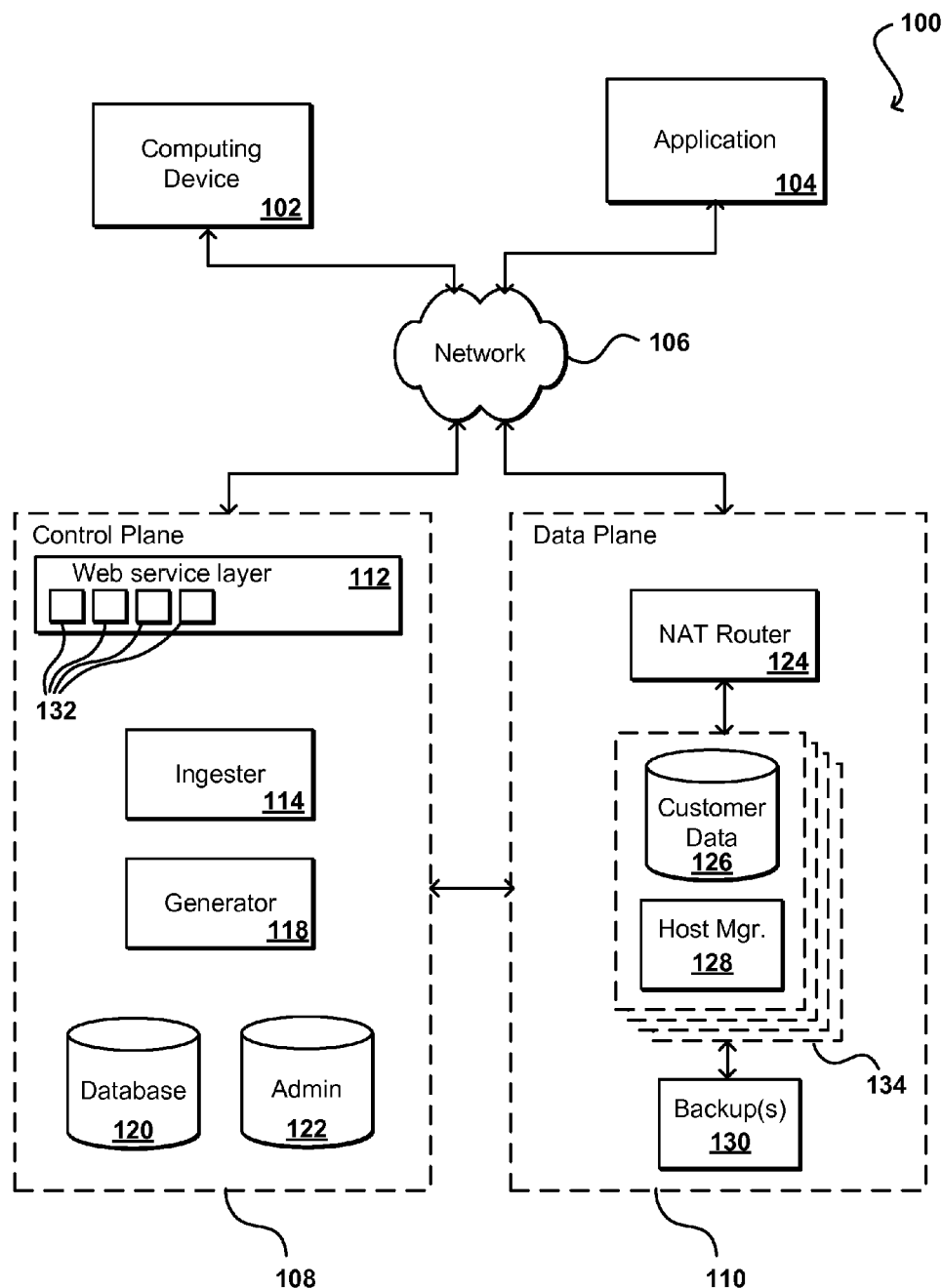
FIG. 1 illustrates an environment in which various embodiments can be implemented, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing security in multi-tenant or other shared resource computing environments. Some hardware and/or software within such environments can support protocols, such as Kerberos, to manage passwords and other such credentials. It is often the case, however, that certain software cannot be modified by a principal (e.g., a user or client) to work with such a protocol. For example, Microsoft Windows™ currently cannot be modified to recognize a Kerberos ticket.

A service such as a virtualized desktop service with underlying software can require a password (or other such credential) in order for a user to login or otherwise become authenticated. That password can be supplied to the underlying software by a component that may perform various forms of authentication. That component may itself use a password, smartcard, biometric information, etc. In various embodiments discussed and suggested herein, a software component having received the password can attempt to perform a Kerberos login. A Kerberos login, in at least some embodiments, can involve sending a message or request to a component such as a key distribution center (KDC) in order to request what is referred to as a "ticket granting ticket" (TGT). That message sent to the KDC can include information, referred to herein as "password information," that can be selected based at least in part on the received password. A response received from the KDC can be encrypted in a way that a key derived from the password, also referred to herein as a type of password information, can be used to decrypt the received message. Kerberos KDCs can have one or more associated principals in various embodiments.

A modified KDC in accordance with various embodiments can create or otherwise obtain multiple instances of password information (e.g., keys). As mentioned, password information may include, but is not limited to: information derived from a password, a password itself, a cryptographic function of the password, or the Kerberos password derived key, among other such options. A Kerberos-derived key is a password derived by, for example, invoking the Kerberos function "stringtokey," which causes an unencrypted password to be transformed into an encryption key suitable for the type of encryption to be used. This function can be called, for example each time a user changes a password or enters the password for authentication. Password information will generally be associated with a principal, who can also be associated with a user, host, or service. One instance of password information in the set of password information can include a string known to the user, while other instances may be under the control of the system such that when a user signs onto a single sign on system, for example, the single sign on system, in addition to creating a webstation for the user, can instruct a KDC to create a password known to the single sign on system, such as may include a 30 character string. That password may be unknown and/or undiscoverable to a user. In various embodiments, this password may be usable for a fixed period of time, a fixed number of uses, or invalidated when a user signs out, among other such options.

In various embodiments, a temporary password can be supplied by a KDC when a user logs into a virtual desktop (e.g., via a webpage) or other component that expects a Kerberos password. From the perspective of the component that expects a Kerberos password, the temporary password is received and treated by the system as if it were the regular password.

In various embodiments, temporary password information can be used to build an Authentication Service (AS) request for Kerberos. An AS request identifies a client to a KDC by, for example, transmitting a message in plain text. In various embodiments, if pre-authentication is enabled, a time stamp will be encrypted using the client's password hash as an encryption key. In such embodiments, the timestamp assists the KDC in determining whether the AS request is a duplicate of another AS request, for example. In some embodiments, the pre-authentication stage enables a KDC to determine which password of the plurality of passwords that have been provided by a component should be used, and issues a response with the correct password and correct key. With pre-authentication, a principal has a value derived from a timestamp and password. The value may be used to determine whether the client has the correct password or which of the plurality of passwords are using the correct password. In addition, an AS request may indicate a requested lifetime (also known as a validity time or expiration time for a ticket). In various embodiments, a TGT, passwords, and/or password information can be associated with respective lifetimes. As such, in accordance with various embodiments, a TGT, one or more passwords, and password information will not enable a user to access an application server, active directory, or the like after their lifetimes have ended. In some embodiments, a lifetime is about ten hours, although other appropriate periods of time can be utilized as well.

Other constraints on tickets or password information may be implemented as well. For example, in some embodiments, password information may be associated with a counter. This counter may be increased and/or decreased until a limit is reached. For example, the counter may stop at zero. When the counter is decremented to zero, the password information may not be used to authenticate a user. In other embodiments, a counter may be incremented until it reaches a limit (e.g., one-hundred) such that the password information may not be used to authenticate a user.

In various embodiments, such a pre-authentication sequence occurs when the initial request for a TGT fails. When that failure occurs the KDC responds with instructions indicating that pre-authentication is required. The client then replies with a current time stamp encrypted using the password derived key. The server verifies that the time stamp is correct, and if correct the KDC responds with a TGT encrypted under the password derived key.

In various embodiments described herein, a KDC cannot be modified to associate a set of password information with a principal. For example, a virtual desktop service may interact with a customer-controlled (e.g., non-modifiable) KDC. In such a case, a proxy KDC may be used to translate the ticket encryption such that the password information as stored by the client is not the same as the password information received by the customer controlled KDC. For example, an unmodified KDC that associates a single instance of password information with a principal that may have a proxy KDC upstream, such that the proxy has both the principal's password and a plurality of alternate passwords, and determines one of the plurality of alternate passwords to work with the unmodifiable KDC that does not recognize the alternate passwords. In some embodiments, a proxy KDC may communicate with the KDC and not the client and/or application server. In other embodiments, a proxy KDC may be communicatively located between a client and a non-modifiable KDC.

FIG. 1 illustrates an example of an electronic resource environment 100 that can be used in accordance with various embodiments. In this example, a computing device 102 for an end user is shown to be able to make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. In various embodiments, a web service may receive an API call to instantiate a KDC and/or a proxy KDC. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration (Admin) data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. As will be discussed below in more detail, the control plane, in some embodiments, may include an ingester 114 that aggregates data from various host computing devices and/or virtual machines. In some embodiments, the ingester 114 may pass information to a database 120, which may be queried by a generator 118 to produce metrics. An ingester 114 can receive information to determine active VMs, resource VMs, or other such resources or components 134 in the data plane 110. Monitoring components as described herein can constantly monitor the health of all the running repositories and/or VMs for the control plane, detect the failure of any of these VMs, and initiate the appropriate recovery process(es).

Each resource VM 134 in the data plane can include at least one data store 126 and a host manager component 128 for the machine providing access to the data store. A host manager in one embodiment is an application or software agent executing on a VM and/or application server, such as a Tomcat or Java application server, programmed to manage tasks such as software deployment and data store operations, as well as monitoring a state of the data store and/or the respective VM. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the VMs for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

Once a VM is provisioned and a user is provided with a DNS address or other address or location, the user can send requests "directly" to the data plane 110 through the network using a Java Database Connectivity (JDBC) or other such client to directly interact with that VM 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as VM or availability failures, for example, can be masked by programmatically remapping a DNS address to any appropriate replacement VM for a use. A request received from a user 102 or application 104, for example, can be directed to a network address translation (NAT) router 124, or other appropriate component, which can direct the request to the actual VM 134 or host corresponding to the DNS of the request. As discussed, such an approach allows for VMs to be dynamically moved, updated, replicated, etc., without requiring the user or application to change the DNS or other address used to access the VM. As discussed, each VM 134 can include a host manager 128 and a data store 126, for example, and can have at least one backup VM or copy in persistent storage 130. Using such an approach, once the VM has been configured through the control plane, a user, application, service, or component can interact with the VM directly through requests to the data plane, without having to access the control plane 108. For example, the user can directly issue SQL or other such commands relating to the data in the VM through the DNS address. The user would only have to access the control plane if the user wants to perform a task such as expanding the storage capacity of an VM. In at least one embodiment, the functionality of the control plane 108 can be offered as at least one service by a provider that may or may not be related to a provider of the data plane 110, but may simply be a third-party service that can be used to provision and manage data VMs in the data plane, and can also monitor and ensure availability of those VMs in a separate data plane 110.

Figure 2:
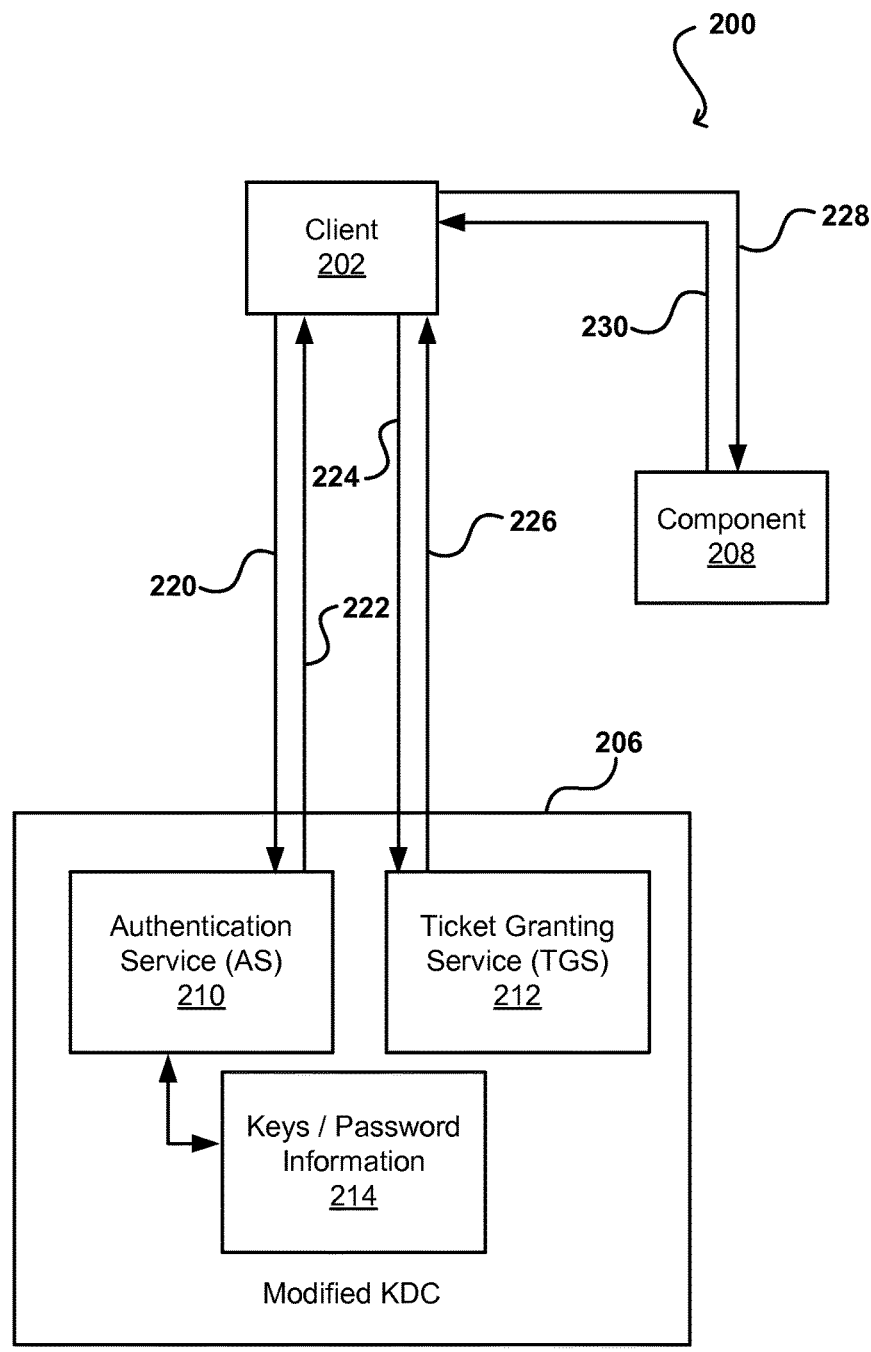
FIG. 2 illustrates an example of system comprising a modified KDC, in accordance with various embodiments.

FIG. 2 illustrates an example 200 of an example of system comprising a modified KDC, in accordance with various embodiments. Example system 200, in accordance with various embodiments, comprises a principal 202 (e.g., a client device communicatively coupled with a multi-tenant environment, a webstation, a web login page, etc.) that allows a user to access various components 208 communicatively coupled within a multi-tenant environment, such as the data plane illustrated in FIG. 1. As discussed previously, these components 208 may include, but are not limited to: virtual machines, servers, software applications, databases, network devices, switches, etc. For example, component 208 may be a virtual desktop running Windows® or a similar operating system. In some embodiments, component 208 may be a virtual desktop hosted by a service provider that is running a modified KDC, as discussed herein. In various embodiments, an operating system (OS) may require a password that the OS uses to communicate with the KDC, while in other embodiments the virtual desktop may be running desktop remoting software that may expect a password that is provided to the OS.

In various embodiments discussed herein, a Kerberos protocol provides authentication in distributed computing environments. A version of the Kerberos protocol may be found in "Kerberos: An Authentication Service for Computer Networks," IEEE Communications, 32(9): 33-38 by B. Clifford Neuman and Theodore Ts'o. September 1994. The Kerberos protocol typically utilizes at least a Key Distribution Center (KDC) 206, a client 202 and a server, as may be included in component 208. In some embodiments, the modified KDC provides at least two services: an Authentication Service (AS) 210 and a Ticket Granting Service (TGS) 212. As illustrated in FIG. 2, in accordance with various embodiments, three exchanges can be involved when the client accesses a server resource: (1) an AS exchange (220, 222); (2) a TGS exchange (224, 226); and (3) a Client/Server (CS) exchange (228, 230).

When initially logging onto a network, a user negotiates access by providing 220 a login credential to be verified by the AS portion of the KDC. In some embodiments a password is provided to the KDC. The KDC has access to Active Directory user account information. The AS identifies the client. If pre-authentication is enabled, a time stamp will be encrypted based at least in part on the user's password (e.g., using the user's password hash stored in the Active Directory). Once successfully authenticated, the user is provided 222 a Ticket to Get Tickets (TGT). This operation is referred to as an AS reply 222. The AS reply includes two sections:

a TGT encrypted with a key that only the TGS can decrypt, and a session key encrypted based at least in part upon the user's password.

In various embodiments, after the client receives a TGT, the client may provide 224 the TGT to the TGS portion of the KDC when the client intends to access a server. The TGS authenticates the client's TGT and creates a ticket and a session key for both the client 202 and the server 208. This information, also referred to as a service ticket, is provided 226 to the client and may be stored locally on the client.

Once a client has a client/server service ticket, the client may provide 228 the service ticket to the server. The server can decrypt information coming indirectly from the TGS using its own key. If mutual authentication is enabled, the server provides 230 a time stamp encrypted using the service ticket session key back to the client.

The modified KDC 206 can also include or acquire a plurality of keys (e.g., instances of password information), which can be associated with a client 202. As discussed above, by providing a client with a plurality of keys or other such credentials, the client may login to components that are not configured to accept a Kerberos service ticket. In various embodiments discussed herein, when a login credential (also referred to as an AS request) is provided 220 to the AS, the KDC creates or obtains a plurality of keys 214. The plurality of keys typically comprises a password known to a user and a plurality of temporary passwords. In some embodiments, various passwords created by the KDC may each have unique characteristics (e.g., a password may expire at a particular time, after a particular number of sessions, etc.). Based at least in part on the pre-authentication request (i.e., a value derived from a timestamp and password provided by a client), the AS determines which key of the plurality of keys to provide 222 the client with. By performing these steps, a client may access a plurality of components configured to accept Kerberos service tickets even though the plurality of components may require different passwords associated with the client's login information. Moreover, in some embodiments, a KDC may be operable to determine an internet protocol (IP) address associated with a client instead of, or in addition to, creating the temporary passwords at least in part upon the pre-authentication step.

Figure 3:
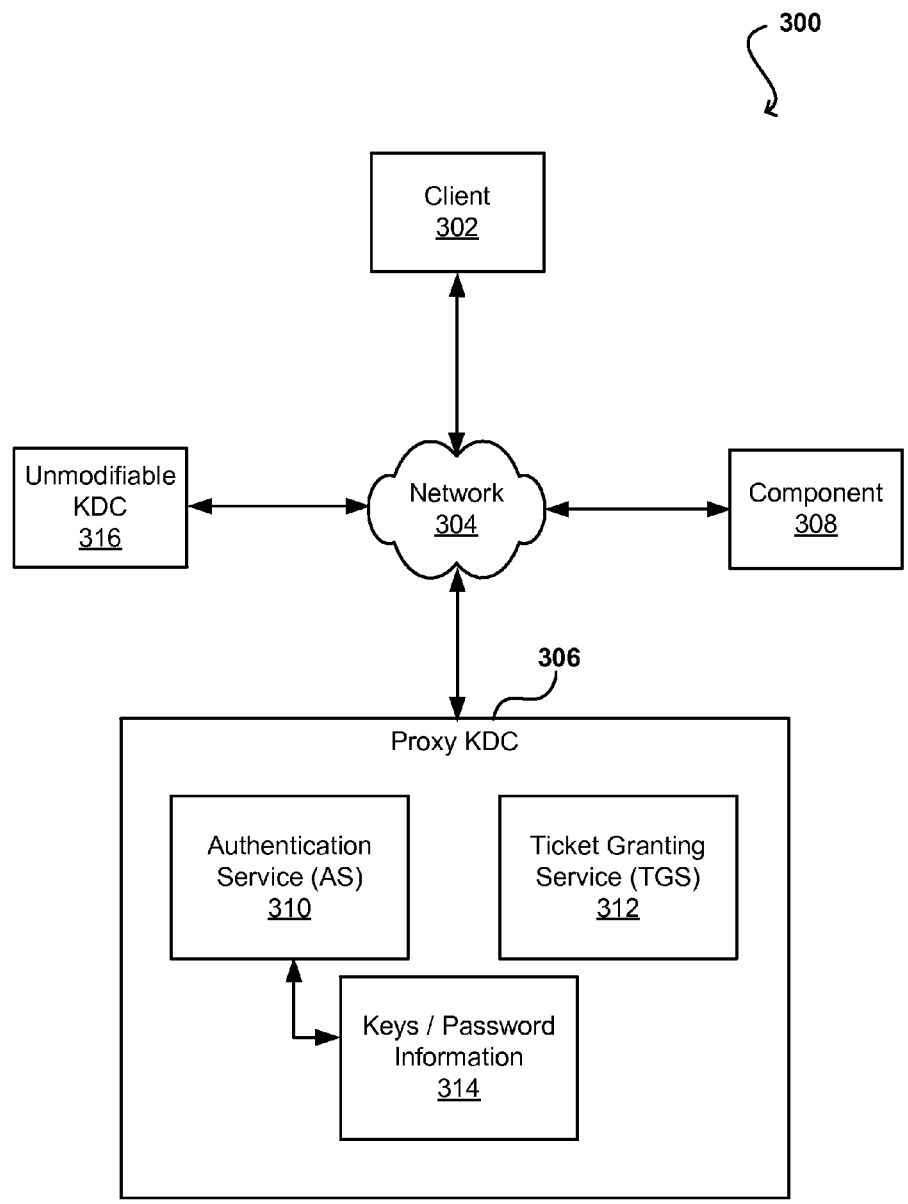
FIG. 3 illustrates an example system comprising a proxy KDC, in accordance with various embodiments.

FIG. 3, in accordance with various embodiments discussed herein, illustrates an example system 300 comprising a proxy KDC 306. In accordance with an embodiment, FIG. 3 comprises a client 302, a network 304, and at least one component 308, as discussed above. The approach in this example also includes an unmodifiable KDC 316 (also referred to as a backend KDC 316), and a proxy KDC 306. As shown in FIG. 3, a proxy KDC may also comprise an AS 310 and a TGS 312, and can generate and/or store a plurality of keys 314 for each associated client 302.

As discussed above, in various embodiments, a KDC may be unmodifiable such that it cannot create a plurality of passwords for a client enabling that client to access a plurality of components which require a plurality of passwords. In order to overcome this obstacle, a proxy KDC 306 may be implemented that allows a client to access an unmodifiable KDC with a plurality of passwords such that the client may be able to access a plurality of components that require a plurality of passwords. The proxy KDC 306 can be configured to intercept or otherwise receive requests from (or for) the client 302, for example, and can perform the necessary actions discussed herein to enable the appropriate credentials to be provided.

In various embodiments, interception and/or proxying could occur in a separate software component running on component 308. For example, the proxy may reside in a Dom-0 or a network filter in the network stack of the component.

Figure 4:
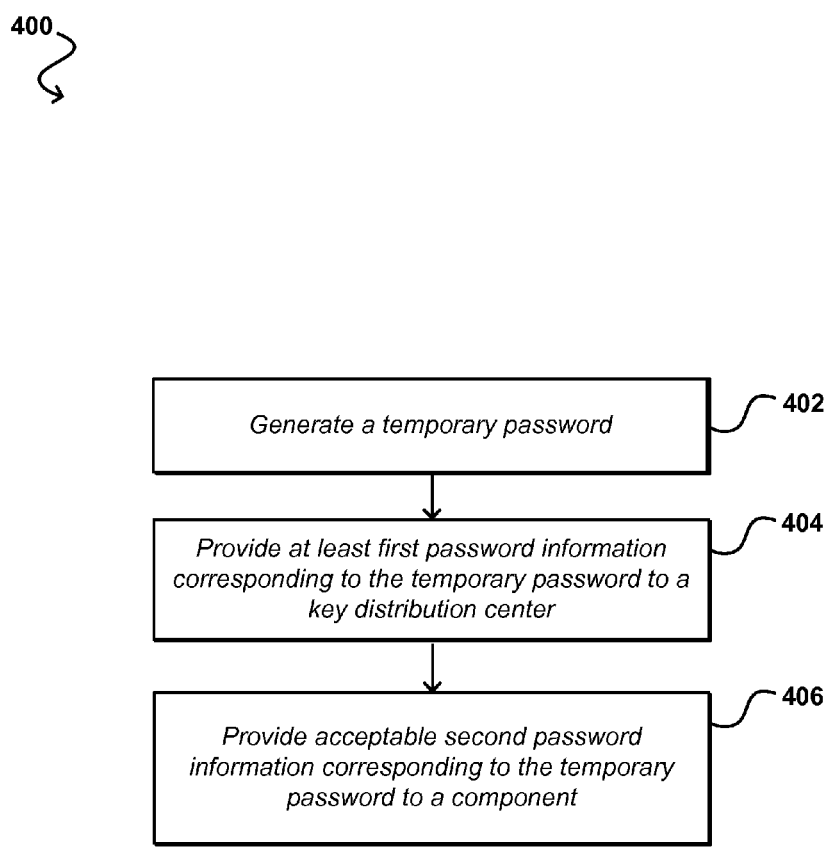
FIG. 4 illustrates an example process for implementing a KDC that comprises a plurality of passwords associated with a principal, in accordance with various embodiments.

FIG. 4 illustrates an example process 400 for implementing a KDC that comprises a plurality of passwords associated with a principal.

In operation 402, in accordance with various embodiments, a temporary password is generated. This temporary password may be based at least in part upon login information associated with a principal, may be sent to a Kerberos KDC that creates a set of password information to access components requiring different passwords. In some embodiments, password information (e.g., information related to a password, or a password created by a "stringtokey" or similar function) may be sent with login information. In some embodiments, a KDC may create one or more instances of password information. In various embodiments, a user interacts with some authentication mechanism, such as a web-based login to login to a multi-component system. When logging in, the user provides a password and/or other authentication data, and a session is established with the KDC. In various embodiments discussed herein, the KDC receives and/or generates password information associated with the user's principal. Password information may be associated with a session, and stored as a cookie, in a database, or somewhere else accessible downstream.

In operation 404, in accordance with various embodiments, at least first password information corresponding to the temporary password is provided to a key distribution center. In various embodiments, the KDC is configured to add the first password information to a set of password information (e.g., keys, information derived from passwords, etc.). In an embodiment, the set of password information includes at least second password information corresponding to a password known to a user. With a single sign in service such as Kerberos, the password known to the user can be all that is required from the user. Other password information may be unknown and/or undiscoverable to a user. In some embodiments, the set of password information is associated with the user. As such, in some embodiments, the password information may be used to authenticate the user.

In operation 406, in accordance with various embodiments, acceptable second password information corresponding to the temporary password is provided to a component. For example, the password information is provided to a component that does not accept the password known to the user. In some embodiments, the component is configured to require the second password information for authentication of the user. In some embodiments, a proxy KDC may receive the second password information, and translate tickets between a KDC and a component. Further, in some embodiments, the second password information may include, but is not limited to: the temporary password information; a derivation of a plurality of passwords; a key computed in accordance with a Kerberos "stringtokey" function, etc.

Figure 5:
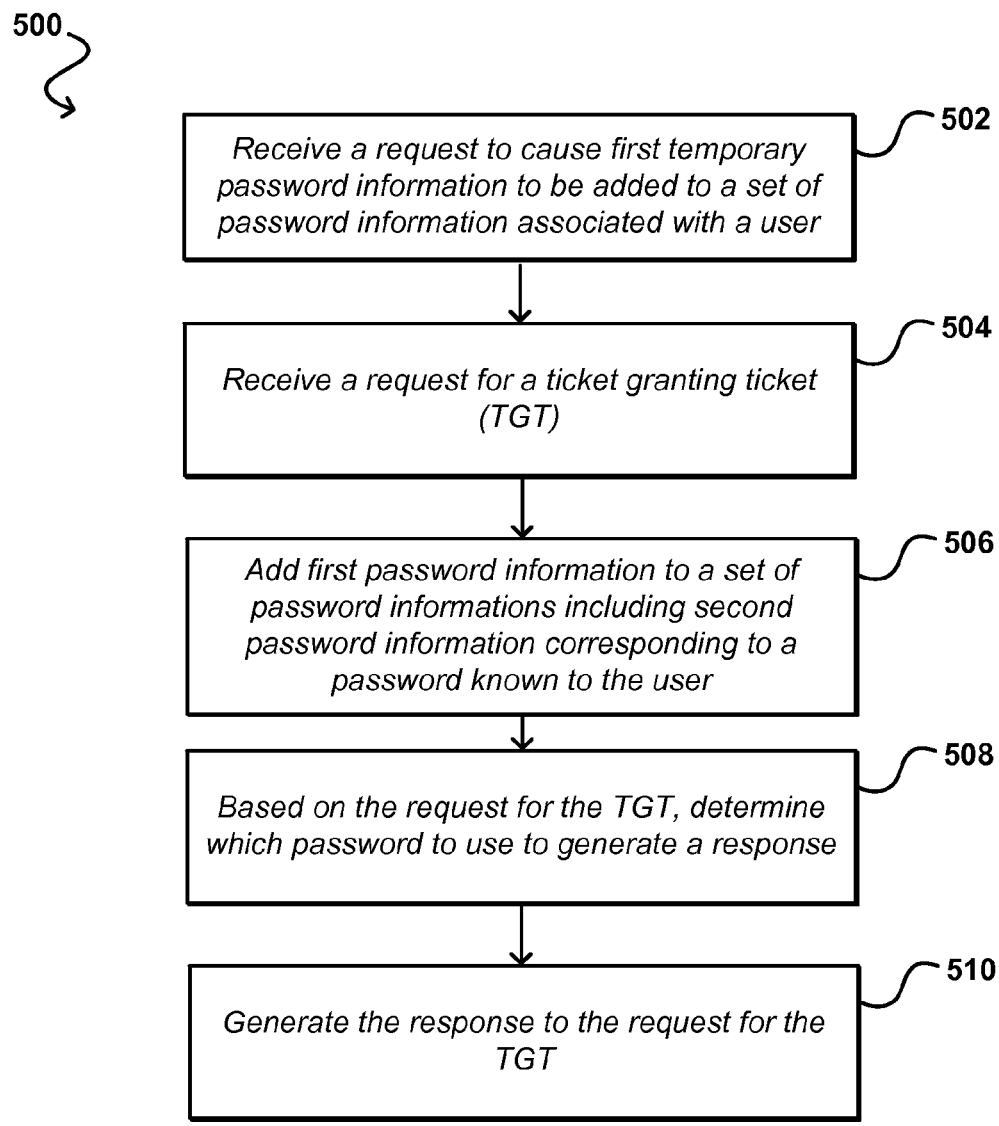
FIG. 5 illustrates an example process for implementing a KDC, in accordance with various embodiments.

FIG. 5 illustrates an example process 500 for implementing a KDC that comprises a plurality of passwords associated with a principal.

In operation 502, in accordance with various embodiments, a request is received to cause temporary password information to be added to a set of password information. For example, a user may send information associated with a password to a KDC. In operation 504, in accordance with some embodiments, a request for a TGT is received. In various embodiments, the request for a TGT is included in an AS request.

In operation 506, first password information is added to a set of password information including second password information corresponding to a password known to a user. For example, in various embodiments, information derived from a first password (e.g., a password known to a user, a derivative of a password known to a user, etc.) may be added to a group of passwords associated with a user. These passwords, in some embodiments, may be used to authenticate a user to an application server, operating system, etc. In some embodiments, an Authentication Server randomly creates a session key and creates the TGT.

In operation 508, in accordance with various embodiments, a password is determined based on the request for the TGT and used to generate a response. In some embodiments, the TGT request provides the lifetime of the TGT, the principal associated with the TGT, etc. In operation 510, in accordance with various embodiments, a response to the request for the TGT is generated. In some embodiments, the response is based on the password information determined in operation 508. For example, the response to the request for the TGT may be encrypted using the session key, or some password information derived from a password known to the user. In some embodiments, the lifetime of the TGT may be included in the response.

Figure 6:
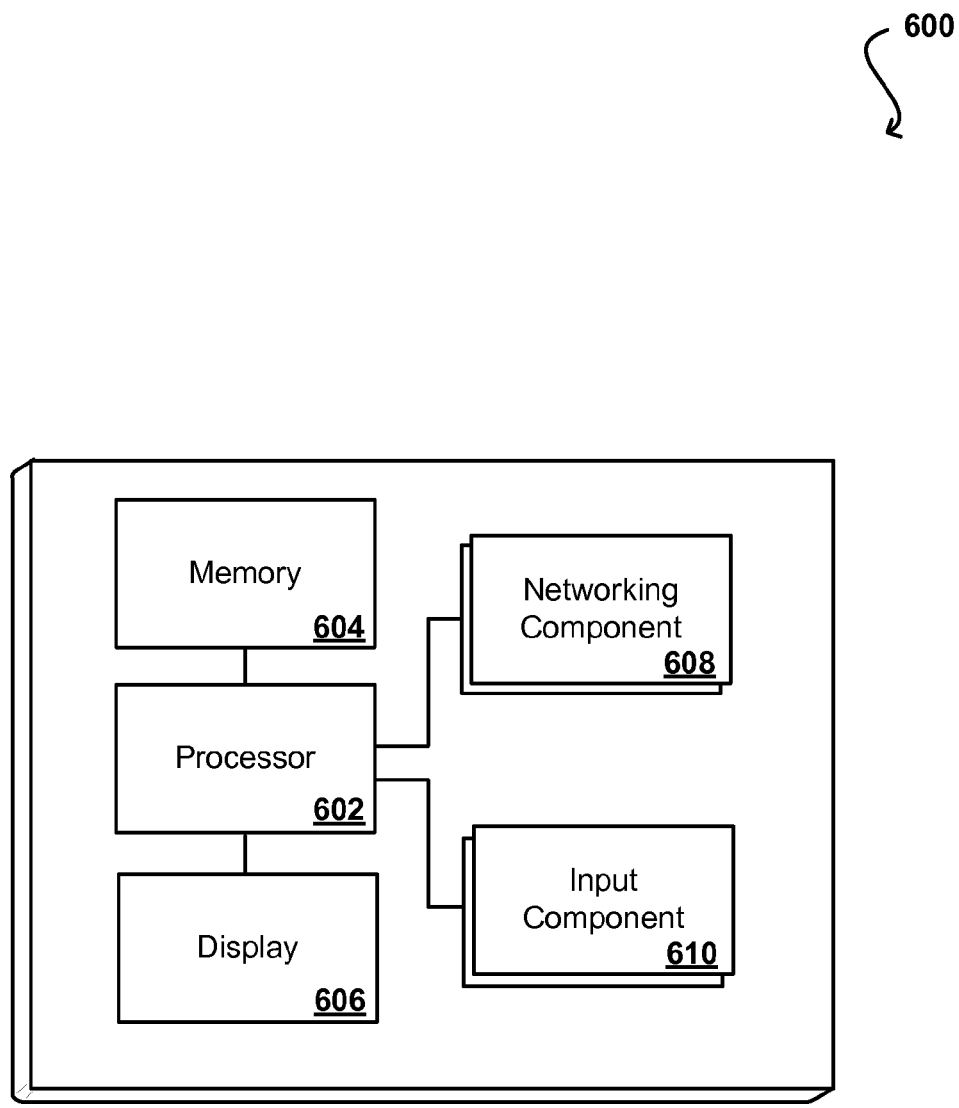
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
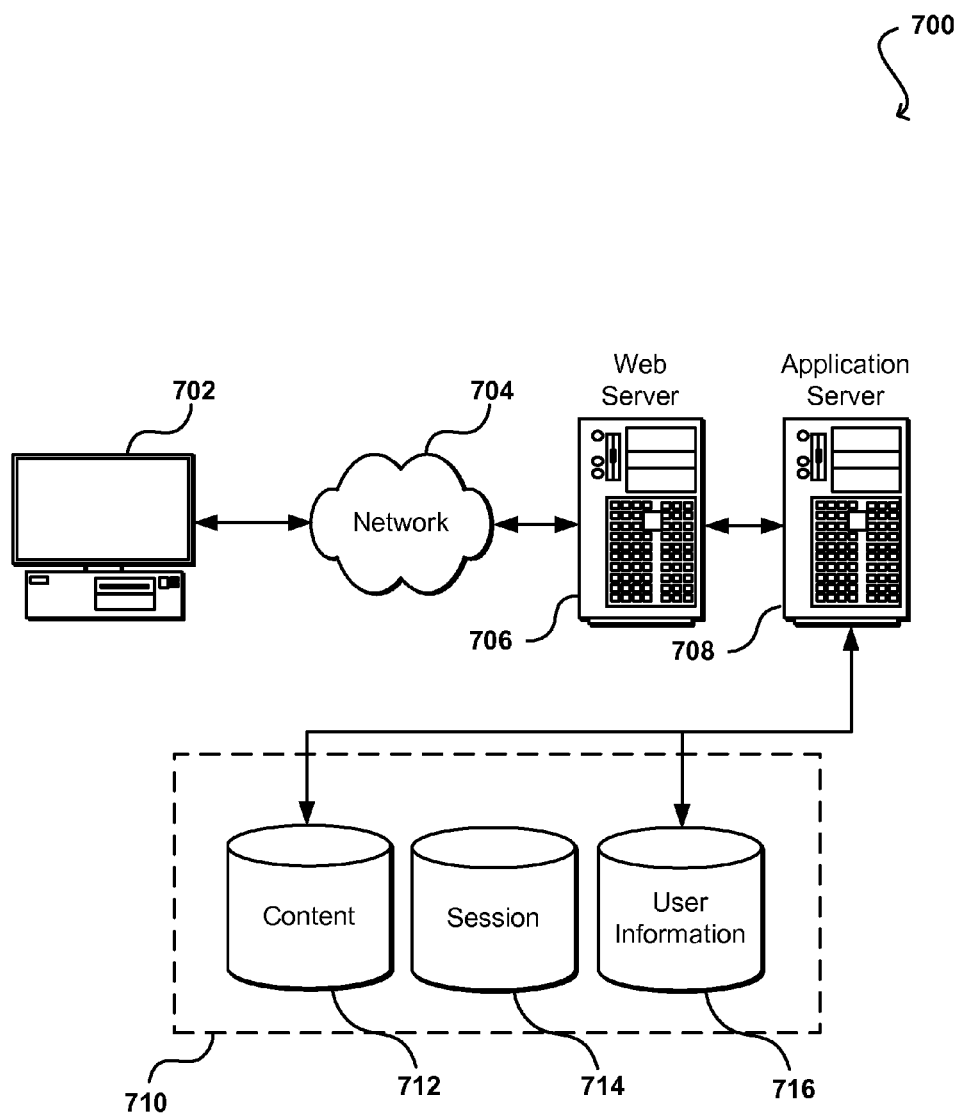
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, wearable computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
one or more processors;
a memory device including instructions that, when executed by the one or more processors, cause the computing system to:
receive a first request to cause temporary password information to be added to a set of password information comprising a plurality of instances of password information, the first request received in response to a login to a multi-tenant computing environment, the set of password information associated with the user and including at least a password known to the user, the set of temporary password information available for generating a ticket granting ticket (TGT);
receive a second request for a security credential to be provided to a target component;
determine, based at least in part on the second request, that the target component to receive the security credential is not configured to accept the TGT; and
generate a response to the second request including at least a subset of the set of password information when the target component is determined as not being configured to accept the TGT.

2. The system of claim 1, wherein the temporary password information is generated in response to the first request to cause the temporary password information to be added to the set of password information.

3. The system of claim 1, wherein the first request includes the temporary password information.

4. The system of claim 1, wherein the instructions when executed further cause the computing system to determine which password information to use to generate the response based at least in part on a pre-authentication field in the second request.

5. The system of claim 1, wherein the instructions when executed further cause the computing system to:
determine a lifetime for the TGT based at least in part upon a lifetime associated with the temporary password information.

6. The system of claim 1, wherein in at least one instance of password information of the set of password information is associated with one or more usage constraints.

7. The system of claim 1, wherein at least one instance of password information has an associated counter, the associated counter configured to be adjusted each time the respective instance of password information is used to authenticate the user, wherein the at least one instance of password information is unable to be used to authenticate the user when the associated counter reaches a limit.

8. The system of claim 3, wherein the instructions when executed further cause the computing system to:
receive for a web service, from the user, a request to instantiate a virtual key distribution center (KDC).

9. The system of claim 3, wherein the instructions when executed further cause the computing system to:
provide the temporary password information to a proxy key distribution center (KDC), the proxy KDC configured to add the temporary password information to the set of password information.

10. The system of claim 9, wherein the instructions when executed further cause the computing system to:
cause the KDC proxy to translate requests for submission to a second KDC, the second KDC not having the first password information but having the second password information associated with the user.

11. A computer-implemented method, comprising:
receiving a first request to cause temporary password information to be added to a set of password information associated with a user, the first request being received in response to a login to a multi-tenant computing environment, and the set of password information associated with the user comprising a plurality of instances of password information;
receiving a second request for authentication information to be provided to a target component, the second request based at least in part upon the temporary password information;
adding the temporary password information to the set of password information, the set of password information including at least password information corresponding to a password known to the user, the temporary password information available for generating a ticket granting ticket (TGT);
determining, based at least in part on the second request for authentication information, that the target component to receive the authentication information is not configured to accept the TGT; and
generating a response to the second request for authentication information including at least a subset of the set of password information when the target component is determined as not being configured to accept the TGT.

12. The computer-implemented method of claim 11, further comprising:
generating a lifetime of the TGT based at least in part on a lifetime associated with the temporary password information.

13. The computer-implemented method of claim 11, wherein the temporary password information is generated in response to the second request or indicated by the second request.

14. The computer-implemented method of claim 11, wherein the subset of the set of password information comprises the temporary password information.

15. The computer-implemented method of claim 11, further comprising:
causing the subset of the set of password information to be determined based at least in part upon a pre-authentication request.

16. The computer-implemented method of claim 11, wherein in at least one instance of password information of the set of password information is associated with one or more usage constraints.

17. The computer-implemented method of claim 11, further comprising:
receiving for a web service and from the user, a request to connect to a key distribution center (KDC), causing a virtual KDC to be instantiated.

18. The computer-implemented method of claim 11, further comprising:
providing the temporary password information to a proxy key distribution center (KDC), the proxy KDC configured to add the temporary password information to the set of password information.

19. The computer-implemented method of claim 18, further comprising:
causing the KDC proxy to translate requests for submission to a second KDC, the second KDC only having the set of password information associated with the user.

20. A non-transitory computer-readable storage medium storing instructions that, when executed by one or more processors of a computing system, cause the computing system to:
- receive a first request to cause a temporary password information to be added to a set of password information comprising a plurality of instances of password information, the first request received in response to a login to a multi-tenant computing environment, the set of password information associated with the user and at least one of the instances of password information in the set of password information corresponding to a password known to the user, the set of temporary password information available for generating a ticket granting ticket (TGT);
- receive a second request for authentication information to be provided to a target component;
- determine, based at least in part on the second request for authentication information, that the target component to receive the authentication information is not configured to accept the TGT; and
- generate a response to the second request for authentication information including at least a subset of the set of password information when the target component is determined as not being configured to accept the TGT.

21. The non-transitory computer-readable storage medium of claim 20, wherein the temporary password information is generated in response to the first request.

22. The non-transitory computer-readable storage medium of claim 20, wherein the instructions when executed further cause the computing system to:
cause the subset of the set of password information to be determined based at least in part upon a pre-authentication request.

23. The non-transitory computer-readable storage medium of claim 20, wherein the instructions when executed further cause the computing system to:
generate a lifetime of the TGT based at least in part on a lifetime associated with the temporary password information.

24. The system of claim 1, wherein at least one instance of the set of password information associated with the user is computed in accordance with a Kerberos function.

25. The computer-implemented method of claim 11, wherein at least one instance of password information has an associated counter, the associated counter configured to be adjusted each time the respective instance of password information is used to authenticate the user, wherein the at least one instance of password information is unable to be used to authenticate the user when the associated counter reaches a limit.

26. The non-transitory computer-readable storage medium of claim 20, wherein at least one instance of password information has an associated counter, the associated counter configured to be adjusted each time the respective instance of password information is used to authenticate the user, wherein the at least one instance of password information is unable to be used to authenticate the user when the associated counter reaches a limit.

* * * * *